UNITED STATES PATENT OFFICE.

OFFER LAURITZ KJÆR ANDERSEN, OF STRUER, DENMARK.

BOILER-FUR PREVENTATIVE.

1,416,925. Specification of Letters Patent. Patented May 23, 1922.

No Drawing. Application filed August 29, 1916. Serial No. 117,535.

*To all whom it may concern:*

Be it known that I, OFFER LAURITZ KJÆR ANDERSEN, manufacturer, residing at Struer, Denmark, and whose postoffice address in Struer, in the Province of Jutland, Denmark, have invented certain new and useful Improvements in or Relating to Boiler-Fur Preventative; and I do hereby declare the following to be a full, clear, and exact description of the invention, such as will enable others skilled in the art to which it appertains to make and use the same.

My invention refers to a boiler-fur preventative in which a lime precipitating base is used in combination with substances containing tannin.

The invention consists in a special combination and quality of such a boiler-fur preventative by which it is rendered very effective.

According to a method of performing this invention which has been found to be very practical and to give good results, the ingredients are given the following weight-proportions: 5 to 15, preferably 10, parts of mangrove bark, 5 to 10, preferably 10, parts of gambier, 20 to 40, preferably 30, parts of catechu (or cutch), 20 to 30 preferably 25, parts of potatoes, and 20 to 30, preferably 25, parts of sodium hydroxide. The potatoes are pressed, and the juice pressed out is used just as it is or diluted with a small quantity of water to give the mixture of the other aforesaid substances a certain solution means, so that the boiler-fur preventative, when the mixture is warmed, appears as a solution of the effective ingredients of the aforesaid substances.

It is not absolutely necessary to use all the aforesaid tannins of the catechu-class or just these, and as hydrous or succulent vegetable substances for giving the mixture all or a part of the requisite quantity of solution means, it is not absolutely necessary to use potatoes, and these hydrous substances may eventually enter into the mixture as such, thus without previous pressing, or as a decoction.

I claim:

A solution for preventing boiler scale consisting approximately of 25 parts, by weight, of sodium hydroxide, 10 parts, by weight, of mangrove bark, 10 parts, by weight, of gambier, 30 parts, by weight, of catechu and 25 parts, by weight, of potato water.

In testimony that I claim the foregoing as my invention, I have signed my name in presence of two subscribing witnesses.

OFFER LAURITZ KJÆR ANDERSEN.

Witnesses:
MOE M. WEINBERG,
H. N. STUART.